(12) United States Patent
Yoon et al.

(10) Patent No.: US 11,481,707 B2
(45) Date of Patent: Oct. 25, 2022

(54) RISK PREDICTION SYSTEM AND OPERATION METHOD THEREOF

(71) Applicant: ISD INC., Incheon (KR)

(72) Inventors: Duk Chan Yoon, Guri-si (KR); Suk Chun, Seoul (KR); Vasundhara Dehiya, Seoul (KR); Won Young Seo, Bucheon-si (KR)

(73) Assignee: ISD INC., Incheon (KR)

( * ) Notice: Subject to any disclaimer, the term of this patent is extended or adjusted under 35 U.S.C. 154(b) by 169 days.

(21) Appl. No.: 16/667,934

(22) Filed: Oct. 30, 2019

(65) Prior Publication Data

US 2020/0193340 A1  Jun. 18, 2020

(30) Foreign Application Priority Data

Dec. 12, 2018 (KR) .......................... 10-2018-0159763

(51) Int. Cl.
*G06Q 10/06* (2012.01)
*G06N 20/00* (2019.01)

(52) U.S. Cl.
CPC ......... *G06Q 10/0635* (2013.01); *G06N 20/00* (2019.01)

(58) Field of Classification Search
CPC ............................ G06Q 10/0635; G06N 20/00
See application file for complete search history.

(56) References Cited

U.S. PATENT DOCUMENTS

| | | | |
|---|---|---|---|
| 2010/0114899 A1 | 5/2010 | Guha et al. | |
| 2010/0116899 A1* | 5/2010 | Pugh | A01B 1/065 239/7 |
| 2012/0316916 A1 | 12/2012 | Andrews et al. | |
| 2014/0379761 A1 | 12/2014 | Adamson et al. | |
| 2016/0371618 A1* | 12/2016 | Leidner | G06N 5/025 |
| 2017/0004128 A1 | 1/2017 | Yoon et al. | |
| 2019/0004128 A1* | 1/2019 | Zens | G01R 33/34092 |
| 2019/0096014 A1* | 3/2019 | Pourmohammad | G06N 5/022 |
| 2019/0096217 A1* | 3/2019 | Pourmohammad | H04W 4/021 |
| 2020/0193340 A1* | 6/2020 | Yoon | G06N 20/00 |
| 2021/0164792 A1* | 6/2021 | Pal | G01C 21/3484 |

FOREIGN PATENT DOCUMENTS

| | | | |
|---|---|---|---|
| JP | 2003-216804 A | | 7/2003 |
| KR | 10-2009-0001940 A | | 1/2009 |
| KR | 102105319 B1 | * | 4/2020 |

\* cited by examiner

*Primary Examiner* — Dylan C White
(74) *Attorney, Agent, or Firm* — NSIP Law

(57) ABSTRACT

Provided are a business default prediction system and an operation method thereof. The method includes collecting a plurality of news articles on the Internet, selecting a business that is an analysis target, classifying news articles related to an analysis target business among the plurality of collected news articles into analysis target articles, calculating a risk level for each of the analysis target articles, generating feature vectors representing each group by performing grouping of the analysis target articles based on the calculated risk level, and calculating the default risk of the analysis target business based on the generated feature vectors.

6 Claims, 12 Drawing Sheets

Fig. 2
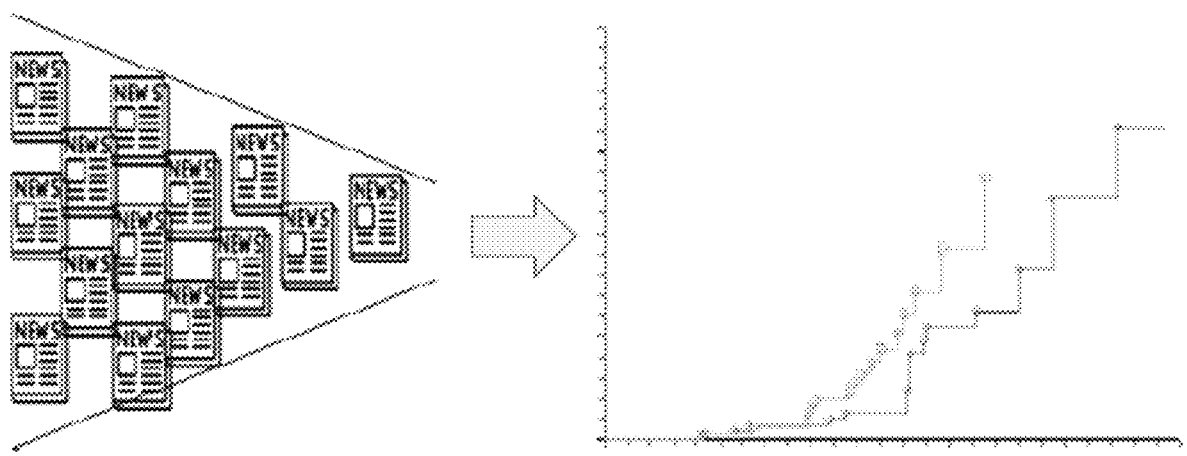
[a]  [b]
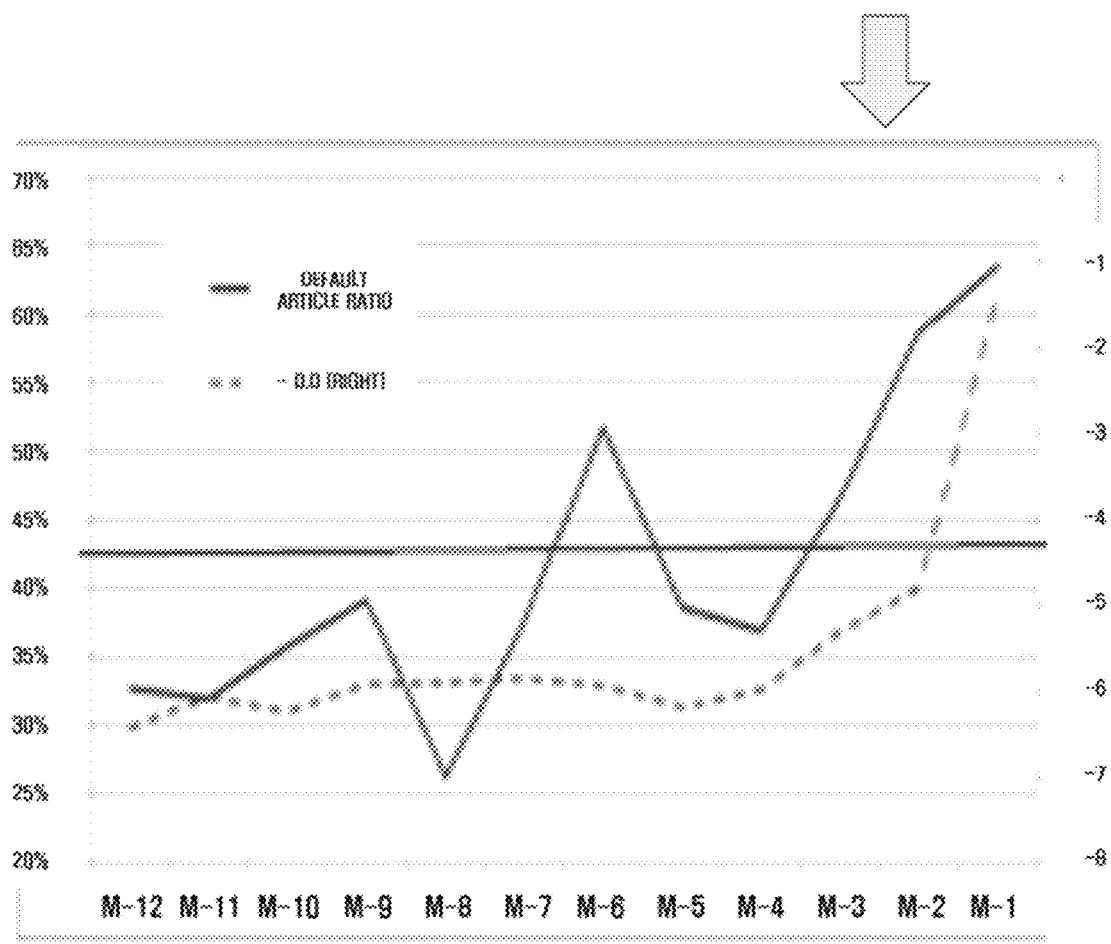
[c]

Fig. 3

January 1st 2016, 00:00:00.000 ~ January 1st 2017, 23:59:59.999

Str_published_at per week

| Time | str_provider | str_content | str_title |
|---|---|---|---|
| December 30th 2016, 00:00:00.000 | SEOUL NEWS | Samsung Electronics Co., the world's leading maker of smartphones and chips, said Thursday that its global brand value has exceeded US$60 billion this year, citing an annual survey of brand management firm Interbrand. | Samsung's global brand value exceeds $60 billion |
| December 30th 2016, 00:00:00.000 | GWANGJU NEWS | Samsung Electronics appears to be preparing to equip some of its upcoming Galaxy smartphones, including the Galaxy S11 series, with rollable displays and rotating cameras, according to news reports Tuesday. | Samsung planning roll-up displays |
| December 29th 2016, 00:00:00.000 | MOODEUNG NEWS | While Samsung Electronics argues the description of its premium TV lineup as QLED has been approved by advertising boards overseas, LG Electronics claims that receiving approval to advertise a product is separate from obtaining approval from the national regulator. | LG, Samsung continue row over QLED classification |
| December 29th 2016, 00:00:00.000 | ASIA TODAY | Samsung and rival Apple have at last settled an epic patent lawsuit that had been dragging on for seven years. Both sides submitted documents to a U.S. federal court in San Jose, California stating that they have reconciled and are ending all legal proceedings. | Samsung Settles Patent Suit with Apple |

Fig. 4

| Company Name | title | CompanyNameExtraction_Result | Entities_extracted |
|---|---|---|---|
| HANGUK PRECISION | Firms in electricity Catch-22 | ACCEPT | HANGUK PRECISION IS : 3, WITH HANGUK PRECISION : 2, FOR HANGUK PRECISION : 1 |
| HANGUK PRECISION | KAIST to work with WEF to prepare for 4th Industrial Revolution | ACCEPT | HANGUK PRECISION CO., LTD. : 1 |
| HANGUK PRECISION | India's 'Sarang' cultural festival to return with unprecedented scale | REJECT | |
| HANGUK PRECISION | Arms Race Begins | ACCEPT | HANGUK PRECISION : 1 |
| HANGUK PRECISION | IBM's Watson to be used at Korean hospital | REJECT | |
| HANGUK PRECISION | Samsung Life Insurance Magnate Outside Bourse | REJECT | |

RISK PREDICTION SYSTEM AND OPERATION METHOD THEREOF

CROSS-REFERENCE TO RELATED APPLICATION

This application claims priority to Korean Patent Application No. 10-2018-0159763 filed on Dec. 12, 2018 and all the benefits accruing therefrom under 35 U.S.C. § 119, the contents of which are incorporated by reference in their entirety.

BACKGROUND

The present disclosure herein relate to a business default prediction system and an operation method thereof, and more particularly, to a system for evaluating a default risk of a business based on news data analysis.

The largest and most important economic main agents in modern society are business. Many businesses are created and disappear each year, and this affects economically related individuals, businesses and even countries. Thus, analyzing the rise and fall of businesses is the basis for the analysis of the entire industry sector, in addition to the industry sector that corresponding businesses belong. There are various reasons why business disappears. If business disappears through default, not only the employees of the business, but also the investors of the business and trading business will be greatly affected.

Accordingly, researches on the prediction of the default possibility for each business have been conducted steadily. In general, the default probability of a business is predicted through interest compensation ratio and debt ratio, which are indicators of how much interest expenses may be covered by business profits. In such a way, in predicting business default possibility financial data that may be obtained quantitatively have been mainly used but recently, a methodology for analyzing business risk based on non-financial data has emerged.

Financial data disclosed by businesses may not reflect adverse effects on the business, and there were also doubts about the reliability of financial reports provided by the business. Therefore, methodologies for analyzing non-financial data are emerging variously, and news article data, which has a sufficient amount of non-financial data to be analyzed enough, has begun to be used.

The amount of news article data is large enough to be an analysis target. However, there have been many difficulties in identifying which business articles the news article is about and determining how to relate it to the default risk.

SUMMARY

The present disclosure provides a method for predicting the default risk of a particular business based on a plurality of news articles.

The present disclosure improves the accuracy of default risk prediction through various machine learning algorithms and analysis methods.

Problems to be solved by the present invention are not limited to the above-mentioned problems, and other problems not mentioned will be clearly understood by those skilled in the art from the following description.

In accordance with an exemplary embodiment of the present invention, a method of predicting a default risk of a business based on news articles, which is performed by a computing system, the method including: collecting a plurality of news articles on the Internet; selecting a business that is an analysis target; classifying news articles related to an analysis target business among the plurality of collected news articles into analysis target articles; calculating a risk level for each of the analysis target articles; generating feature vectors representing each group by performing grouping of the analysis target articles based on the calculated risk level; and calculating the default risk of the analysis target business based on the generated feature vectors.

In an embodiment, the calculating of the risk level for each of the analysis target articles may include, after adopting a specific machine learning algorithm and performing regression or itemization analysis on the collected news articles using the machine learning algorithm, calculating the risk level for each of the analysis target articles using a risk calculation algorithm derived through the regression or itemization analysis.

In an embodiment, the method may further include, in performing the regression or itemization analysis on the collected news articles, selecting, as an analysis target, only news articles published within a predetermined time from the default of the corresponding business among news articles related to the business where default occurs.

In an embodiment, the classifying of the news articles related to the analysis target business among the plurality of collected news articles into the analysis target articles may further include: selecting news articles including the name of the analysis target business; and determining whether an article is related to the analysis target business with respect to each of the selected news articles.

In an embodiment, the determining whether the article is related to the analysis target business with respect to each of the selected news articles may further include identifying a context or topic for each of the selected news articles and determining whether the identified context or topic is related to the analysis target business information.

In an embodiment, the generating of the feature vectors representing each group by performing the grouping of the analysis target articles based on the calculated risk level may include classifying a risk level into a plurality of sections based on the risk level calculated for the analysis target articles, and through this, performing grouping of the analysis target articles.

In an embodiment, the classifying of the risk level into the plurality of sections may perform classification in different methods according to a type of industry to which the analysis target business belongs.

In an embodiment, the calculating of the default risk of the analysis target business based on the generated feature vectors may further include, after classifying feature vectors of the analysis target articles on which grouping is performed through a decision tree algorithm, calculating a default risk prediction value of the analysis target business based on the classification result.

In an embodiment, the classifying of the feature vectors of the analysis target articles on which the grouping is performed through the decision tree algorithm may further include, after classifying data including feature vectors generated for a group of the analysis target articles into n, classifying feature vectors by applying a decision tree algorithm to n data sets through an n-cross validation method.

In accordance with another exemplary embodiment of the present invention, a computing system that predicts a default risk of a business based on news articles includes: a news article collection unit configured to collect a plurality of news articles on the Internet; an analysis business selection unit configured to select a business that is an analysis target; an analysis target article classification unit configured to classify news articles related to an analysis target business among the plurality of collected news articles into analysis target articles; a risk level calculation unit configured to calculate a risk level for each of the analysis target articles; a feature vector generation unit configured to generate a feature vector representing each group by performing grouping of the analysis target articles based on the calculated risk level; and a default risk prediction unit configured to calculate the default risk of the analysis target business based on the generated feature vector.

BRIEF DESCRIPTION OF THE DRAWINGS

Exemplary embodiments may be understood in more detail from the following description taken in conjunction with the accompanying drawings, in which:

FIG. 2 is a flowchart schematically illustrating a method of operating a business default prediction system according to an embodiment of the present invention;

FIG. 3 is a diagram illustrating an operation of collecting news articles by a default prediction device according to an embodiment of the present invention;

FIG. 4 is a diagram illustrating a method of classifying a news article related to an analysis target business into an analysis target article through NER algorithm by a default prediction device according to an embodiment of the present invention;

DETAILED DESCRIPTION OF EMBODIMENTS

Figure 1:
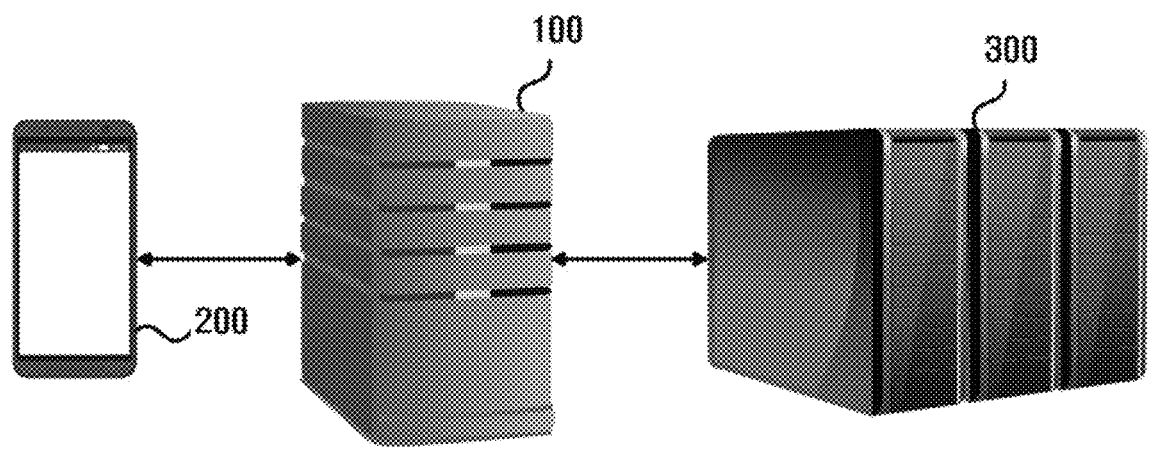
FIG. 1 is a screen schematically illustrating an environment in which a business default prediction system operates according to an embodiment of the present invention.

The terms used in this specification are used only for explaining specific embodiments while not limiting the present invention. The terms of a singular form may include plural forms unless referred to the contrary. The meaning of "comprises," and/or "comprising" in this specification specifies the mentioned component but does not exclude at least one another component. Like reference numerals refer to like elements throughout the specification and the term "and/or" includes any and all combinations of one or more of the associated listed items. Although "first" and "second" are used to describe various devices, components and/or sections, it is apparent that they are not limited to those terms. These terms are just used to distinguish a component from another component. Therefore, it is apparent that the first component mentioned below may be the second component within the technical spirit of the present invention.

When it is described in the entire specification that one part "includes" some elements, it means that the one part may include only those elements, or include other elements as well as those elements if there is no specific limitation. The terms "part", "module", and the like, which are described in the specification, mean a unit for processing at least one function or operation, and may be implemented in hardware or software, or in a combination of hardware and software.

FIG. 1 is a screen schematically illustrating an environment in which a business default prediction system operates according to an embodiment of the present invention.

Referring to FIG. 1, the business default prediction system may include a default prediction device 100, a user terminal 200, and an external server 300.

The default prediction device 100 may collect news articles and perform a default risk forecast for a specific business through analysis of collected news articles.

The default prediction device 100 may be configured as a computing system having memory means and arithmetic devices. That is, the default prediction device 100 may be configured as a server having an intensive processing function, and unlike this, the default prediction device 100 may be configured as one of digital devices having a computing capability by mounting a microprocessor and having a memory means, such as a personal computer (e.g., a desktop computer, a notebook computer, etc.), a workstation, a PDA, a web pad, or the like. Software that implements a function related to the default prediction may be recorded as being stored or installed in the memory means included in the default prediction device 100.

The user terminal 200 may be a terminal used by a user who wants to obtain information related to a default risk of a specific business through communication with the default prediction device 100.

The user terminal 200 according to an embodiment of the present invention may include all kinds of handheld based wireless communication devices that may be connected to a web server through a network, such as a mobile phone, a smart phone, a personal digital assistant (PDA), a portable multimedia player (PMP), a tablet PC, and the like, and may be one of digital devices having a computing capability with a memory means and a microprocessor equipped, such as a personal computer (e.g., a desktop computer, a notebook computer, etc.), a workstation, a PDA, a web pad, or the like.

According to an embodiment, the user may transmit identification information on a business for which a user wants to know the default risk property to the default prediction device 100 by using the user terminal 200 and receive and check information on the default risk prediction for the corresponding business analyzed by the default prediction device 100 through the user terminal 200.

The external server 300 is a server that is not managed by the management main agent of the default prediction device 100. According to an embodiment, the external server 300 may be a server including news data. The default prediction device 100 may access the external server 300 to collect news data. The collection of news data performed by the default prediction device 100 may be accomplished by crawling various types of news data published on the web. In this case, the default prediction device 100 may collect news data from the plurality of external servers 300. In such a way, the number of external servers 300 is not limited to a specific number, of course.

The default prediction device 100 may perform communication with the user terminal 200 and the external servers 300 through a communication network implemented in various ways.

The communication network may be implemented as one of a wired communication network, a wireless communication network, and a composite communication network. For example, the communication network may include a mobile communication network such as 3G, Long Term Evolution (LTE), and LTE-A. The communication network may include a wired or wireless communication network such as Wi-Fi, Universal Mobile Telecommunisations System (UMTS)/General Packet Radio Service (GPRS), or Ethernet. The communication network may include a local area communication network, such as magnetic Secure Transmission (MST), Radio Frequency IDentification (RFID), Near Field Communication (NFC), ZigBee, Z-Wave, Bluetooth, Bluetooth Low Energy (BLE), or InfraRed communication (IR). The communication network may include a Local Area Network (LAN), a Metropolitan Area Network (MAN), a Wide Area Network (WAN), or the like. FIG. 2 is a flowchart schematically illustrating a method of operating a business default prediction system according to an embodiment of the present invention.

Referring to FIG. 2, the default prediction device 100 may finally predict a default risk of a business schematically through a three-step operation.

Operation (a) of FIG. 2 is an operation of collecting news data and performing preprocessing. Operation (b) is an operation of calculating a risk level for each news article. Operation (c) is an operation of finally predicting a default risk of a business.

Referring to operation (a) of FIG. 2, in operation (a), the default prediction device 100 may collect news articles through crawling by accessing the Internet. In this process, the default prediction device 100 may collect only news articles including the name of the analysis target business selected as the analysis target.

Thereafter, the default prediction device 100 may determine whether the news articles collected are related to the analysis target business, and through this, classify some of the plurality of news articles as analysis target articles. For example, even if a news article exists that contains the name of the analysis target business in the form of text, there may be cases where the name is used for another purpose other than referring to the name of the analysis target business on the text of the news article. In addition, there may be cases where the context or topic of the article is not related to the business targeted for analysis. In the above cases, the news article contains the name of the analysis target business, but the articles may not be classified as an analysis target article.

Referring to operation (b) of FIG. 2, in operation (b), the default prediction device 100 may calculate a risk level for each of the analysis target articles classified as being related to the business targeted for analysis.

In operation (b), the risk level calculation for each of the analysis target articles may be performed through machine learning. That is, the default prediction device 100 may set at least some of the collected news articles as a training set and a test set for machine learning and adopt certain machine learning algorithms, and then, analyze the training data through corresponding machine learning algorithms and apply it to the test data to derive the risk calculation algorithm used to calculate the risk level through a method of evaluating the analysis results. Thereafter, the default prediction device 100 may calculate a risk level for the analysis target articles through the derived risk calculation algorithm.

The default prediction device 100 performs learning and testing on various kinds of machine learning algorithms in the above manner and evaluates the results to adopt a machine learning algorithm with the best evaluation results. Adoption of the machine learning algorithm according to the evaluation result may be automatically performed by the default prediction device 100, and an administrator of the default prediction device 100 may check and select the evaluation result.

According to an embodiment, the training data includes information on which business a default occurs, so that the default prediction device 100 may evaluate the machine learning algorithm by using such information. For example, depending on the degree that the risk level of a news article for a business that has a default value is calculated to be high and the risk level of a news article for a business that does not have a default value is calculated to be low, evaluation of machine learning algorithms may be performed.

In operation (b), the risk calculation algorithm derived by the finally adopted machine learning algorithm may be utilized to calculate a risk level for each of the analysis target articles.

Referring to operation (c) of FIG. 2, the default prediction device 100 may finally perform default risk prediction of a business based on a risk level of news articles calculated in operation (b).

The default prediction device 100 may calculate the default risk of the analysis target business in a numerical form based on the risk levels of the analysis target articles classified for the analysis target business. In addition, the default prediction device may determine the default prediction for the business in a yes or no form based on the calculated default risk and additionally calculate the calculated default risk.

In calculating the default risk of the analysis target business based on the risk level of the analysis target articles, the default prediction device 100 may group the analysis target articles based on the calculated risk level, generate feature vectors for each group, and calculate the default risk based on this.

FIG. 3 is a diagram illustrating an operation of collecting news articles by the default prediction device 100 according to an embodiment of the present invention.

Referring to FIG. 3, the default prediction device 100 may collect news articles through crawling on the Internet. Only news articles about a specific business among news articles collected by the default prediction device 100 are shown in FIG. 3.

According to an embodiment, the default prediction device 100 may select only news articles including a name of a specific business among all the news articles using a morpheme analysis library such as Lucene.

FIG. 4 is a diagram illustrating a method of classifying a news article related to an analysis target business into an analysis target article through NER algorithm by the default prediction device 100 according to an embodiment of the present invention.

Referring to FIG. 4, in classifying articles related to the analysis target business, the default prediction device 100 may utilize a specialized Named Entity Recognition (NER) algorithm. As described above in FIG. 3, only news articles including the name of a specific business may be selected from all the news articles using a morpheme analysis library but in this case, some problems exist in classifying the selected articles as analysis target articles. Looking at the problems, there was a case where certain news was not related to the business at all, and there have been cases where irrelevant articles were selected because the morpheme analysis library allowed articles that were determined to be slightly misspelled. In addition, since the name of a specific business is used not only as the name of the corresponding business but also used as the name of a product sold by the business, articles where business names were used for different meanings were selected in some cases.

In order to solve the above problems, the default prediction device 100 may utilize the NER algorithm to determine whether the news articles selected through the morpheme analysis library are news related to the analysis target business, and may classify corresponding articles as analysis target articles. That is, the default prediction device 100 may select news articles including the name of the analysis target business by using a morpheme analysis library, and determine whether the article is related to the analysis target business for each of the selected news articles through the NER algorithm.

According to an embodiment, the NER algorithm may be implemented through R, which is a programming language, and may be implemented by using POS tagging and n-gram methods. Part-Of-Speech (POS) tagging refers to a method of dividing text according to grammatical functions or forms, and such division may be performed through various criteria. n-gram is a method of grouping words and may refer to a method of classifying a sentence into groups having n syllables or words and performing analysis thereof.

Referring to FIG. 4, it may be determined whether articles selected for the analysis target business are related to the analysis target business through the NER algorithm. Based on whether the text including the name of the business is extracted, the NER algorithm may be applied to determine whether the article is related to the analytics target business. As shown in FIG. 4, the result may be derived in a yes or no form such as 'ACCEPT' or 'REJECT'.

As above, according to the NER algorithm, the context or topic for each of the selected news articles may be identified, and it may be determined whether the identified context or topic is related to the analysis target business information. It may be determined whether a name of a specific business is used as another meaning other than referring to the corresponding business.

Figure 5:
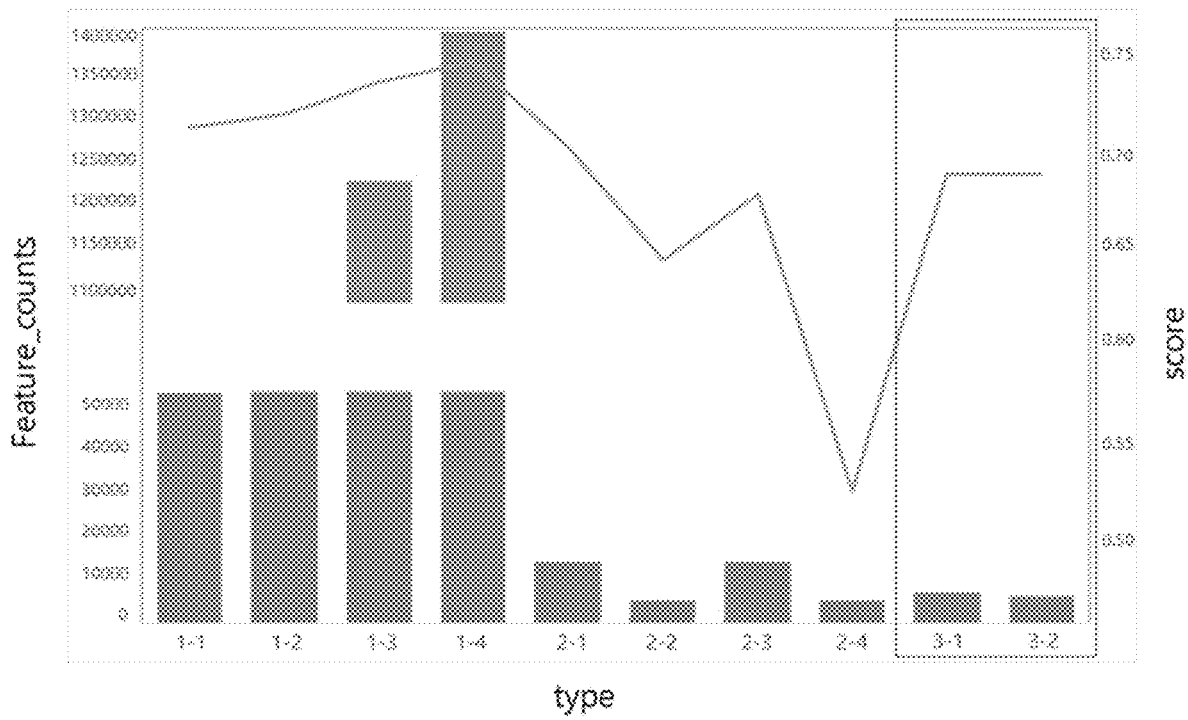
FIG. 5 is a diagram illustrating a process of selecting an independent variable used in calculating a risk level for analysis target articles by a default prediction device according to an embodiment of the present invention.

FIG. 5 is a diagram illustrating a process of selecting an independent variable used in calculating a risk level for analysis target articles by the default prediction device 100 according to an embodiment of the present invention.

In performing the analysis on the analysis target articles classified through the method described above with reference to FIGS. 3 and 4, the default prediction device 100 may utilize a machine learning algorithm. The default prediction device 100 may derive a risk calculation algorithm by adopting a specific machine learning algorithm, setting some of the analysis target articles as training data, and then performing analysis on the same. The machine learning algorithm used in this process may utilize a regression or itemization analysis method.

Referring to FIG. 5, the default prediction device 100 may select independent variables to be used for calculating a risk level through various methods. The independent variables used to calculate the risk level may include at least some of the sentences or words included in the news articles.

According to an embodiment, the default prediction device 100 may classify and select words included in news articles in an n-gram format, and may select words through various feature selection methods. In addition, based on the sparsity calculated according to the frequency of words appearing in the news article, a word to be used as an independent variable may be selected in performing the risk level calculation.

FIG. 5 shows a result value when an independent variable is selected in various ways. In the graph on the right side of FIG. 5, the horizontal axis represents a manner in which independent variable selection is made different from each other, and the bar graph represents the number of independent variables used in each method, and the line graph represents an evaluation score for each method.

Referring to FIG. 5, as shown in the 1-3 and 1-4 schemes, when the number of independent variables increases, an evaluation score may also increase accordingly. However, in this way, the problem of overfitting may occur and the scheme of dealing with too large number of independent variables may demand excessive resources of computing system. Thus, as shown in the 3-1 and 3-2 schemes, when a suitable number of independent variables are selected, appropriate evaluation scores may be calculated without problems of overfitting.

Figure 6:
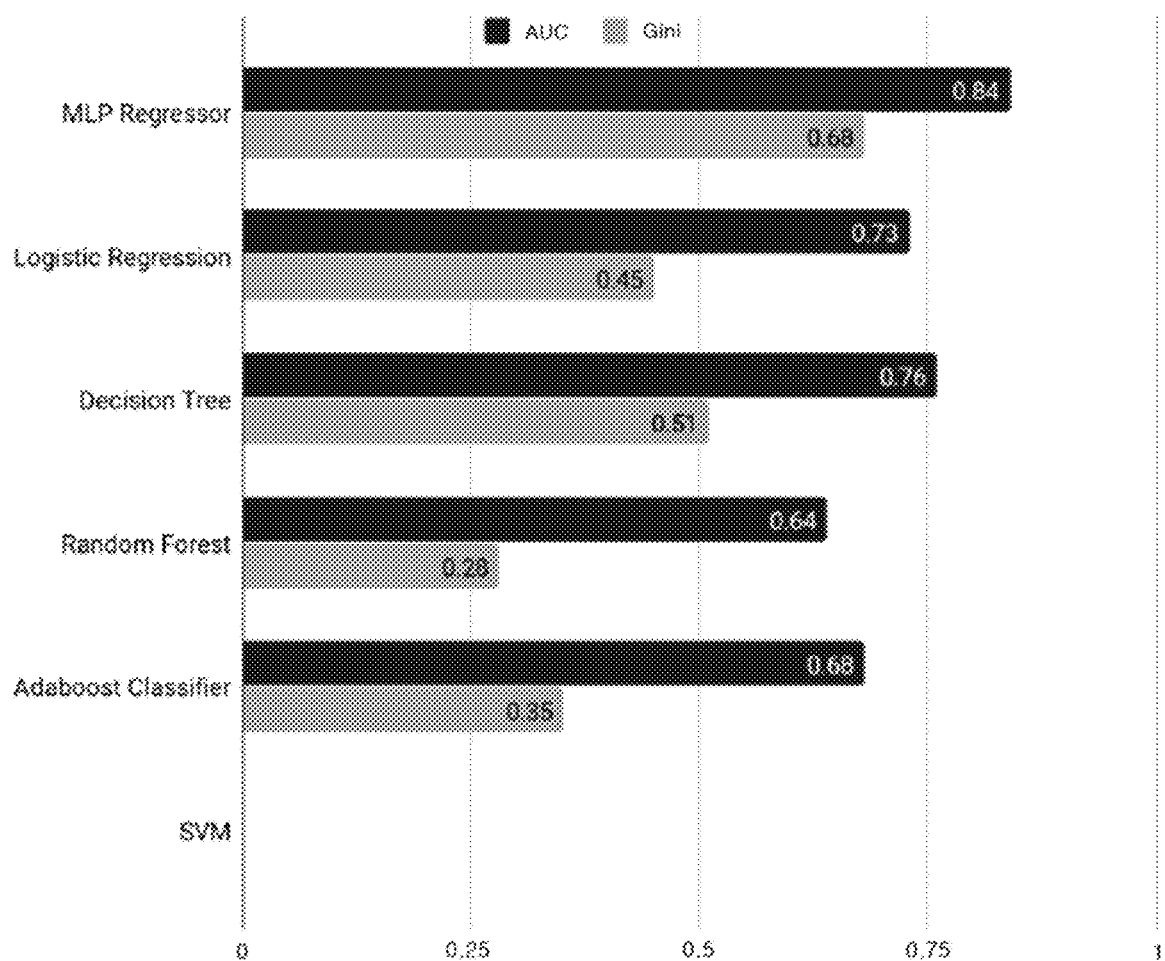
FIG. 6 is a diagram illustrating a process of selecting a machine learning algorithm to be used for calculating a risk level for analysis target articles by a default prediction device according to an embodiment of the present invention.

FIG. 6 is a diagram illustrating a process of selecting a machine learning algorithm to be used for calculating a risk level for analysis target articles by the default prediction device 100 according to an embodiment of the present invention.

Referring to FIG. 6, the default prediction device 100 may adopt various kinds of machine learning algorithms to analyze analysis target articles and derive a risk calculation algorithm based on the analysis results. According to one embodiment, the machine learning algorithm may use regression analysis or itemization analysis. The type of machine learning algorithm may include MLP Regression, Logistic Regression, Decision Tree, Random Forest, Adaboost Classifier, Support Vector Machine (SVM), and the like, as shown in FIG. 6. However, it is apparent that the type of machine learning algorithm that the default prediction device 100 may adopt and use is not limited to the above examples.

FIG. 6 shows numeral values obtained by evaluating the results of analyzing the analysis target article through various types of machine learning algorithms, through AUC and Gini values. Area Under Curve (AUC) is a calculation method used to evaluate the performance of discrimination models in statistics and means the area under the Receiver Operating Characteristics (ROC) curve shown in the graph with the X-axis set to False Positive Rate and the Y-axis set to True Positive Rate. The maximum value of AUC is 1, and as the value is higher, the classification performance is better. The Gini value is also one of the calculation methods used in statistics to evaluate the performance of discrimination models. In the graph, when the area between the ROC curve and the diagonal line starting at the origin and dividing the graph in half is called A and the area under the ROC curve is B, it may be obtained by dividing A by (A+B). The relationship between the AUC and the Gini value may be a relationship in which the Gini value is calculated by subtracting 1 from the value obtained by multiplying the AUC by 2.

The default prediction device 100 may adopt a specific machine learning algorithm based on the evaluation result as described above, and calculate the risk level for each of the analyzed target articles using the risk calculation algorithm derived through the adopted algorithm.

Figure 7:
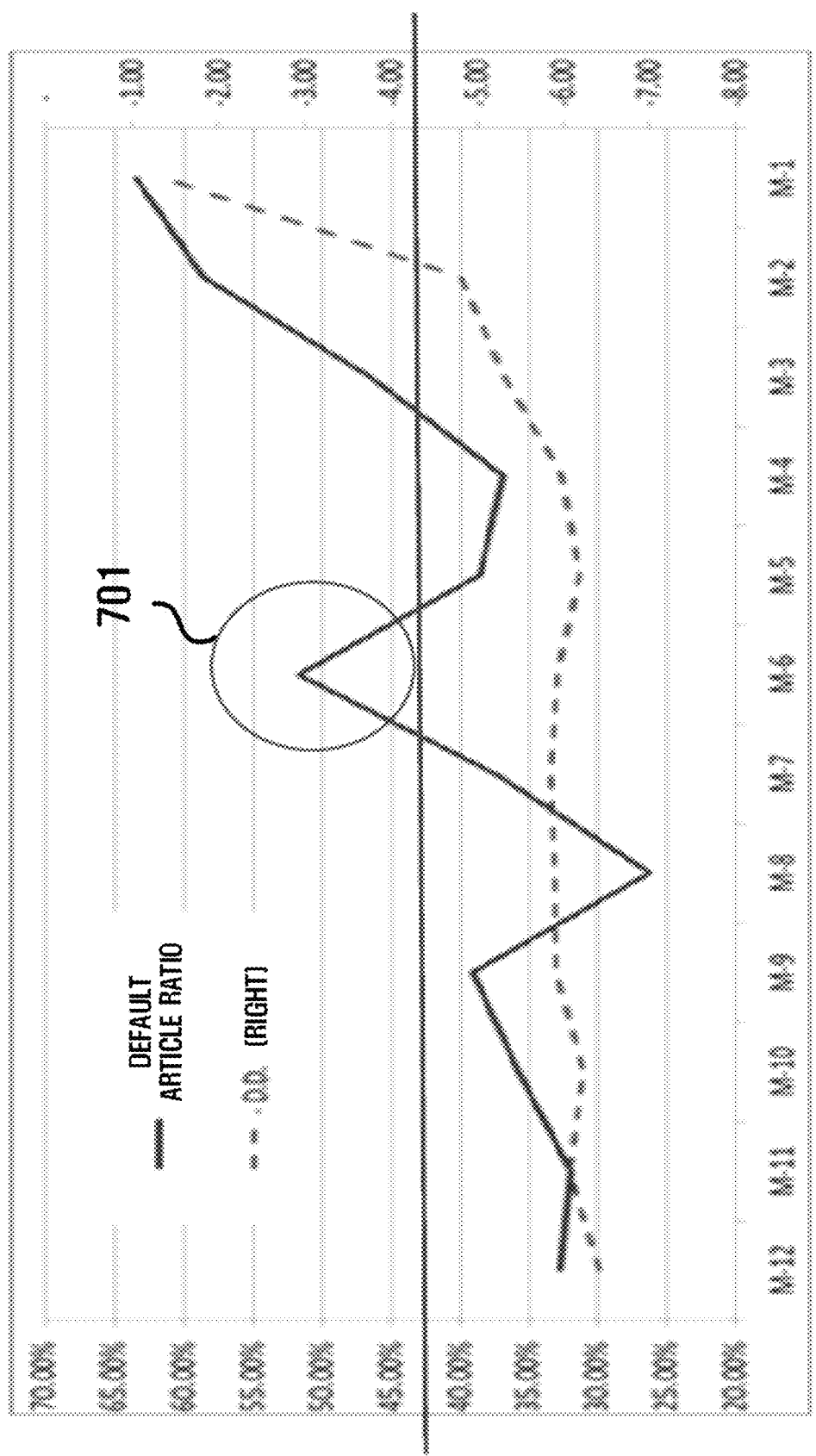
FIG. 7 is a diagram illustrating a process of predicting a default of a business by a default prediction device based on a risk level of analysis target articles according to an embodiment of the present invention.

FIG. 7 is a diagram illustrating a process of predicting a default of a business by the default prediction device 100 based on a risk level of analysis target articles according to an embodiment of the present invention.

Referring to FIG. 7, the default prediction device 100 may determine the default article ratio based on the risk level of the analysis target articles related to the analysis target business, and thus calculate the default risk. Referring to FIG. 7, there is an approximate error, but it is shown that as time goes on, the ratio of default articles is gradually increased. From a time point of M-4, which is four months before the default occurs, it is shown that the default risk numerical value (Distance to Default (D.D)) increases also with the ratio of default articles. In the portion 701 shown in circle in FIG. 7, although the rate of default articles increases temporarily, the default risk numerical value did not show much change. As such, even if the default article ratio temporarily increases or decreases, the default prediction device 100 may control the default risk numerical value not to overly relate thereto and not to change.

Figure 8:
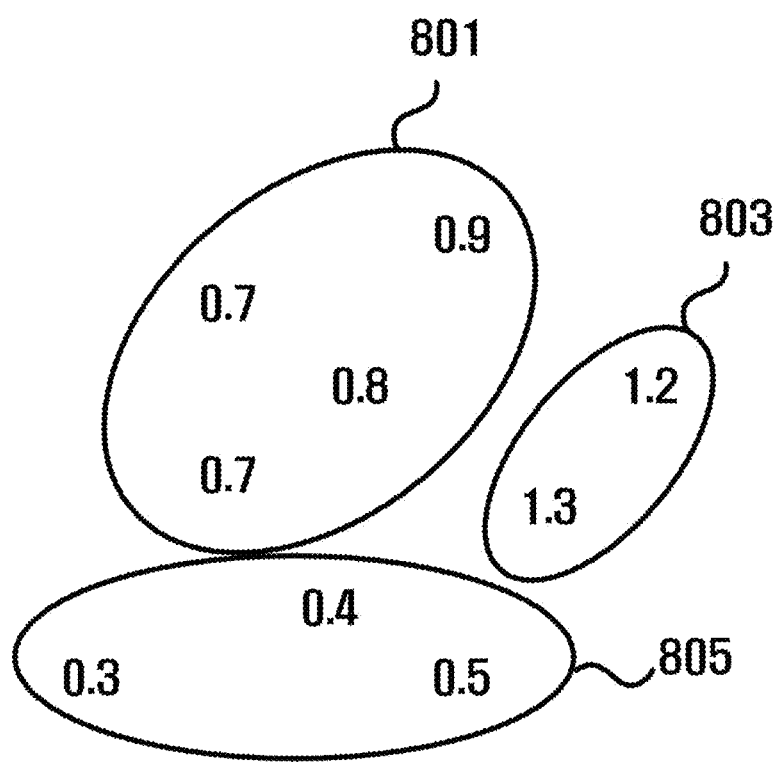
FIG. 8 is a diagram illustrating a method of grouping analysis target articles related to a specific business by a default prediction device according to an embodiment of the present invention.

FIG. 8 is a diagram illustrating a method of grouping analysis target articles related to a specific business by the default prediction device 100 according to an embodiment of the present invention.

Referring to FIG. 8, risk levels of a plurality of analysis target articles are shown in numerical form, and a form in which grouping of analysis target articles is performed based on the risk level is shown.

According to one embodiment of the present invention, a plurality of analysis target articles may be displayed as risk levels of various numerical values, as shown in FIG. 8, and this may be grouped into a plurality of groups according to any criteria based on a risk level. In FIG. 8, it is shown that analysis target articles with risk levels of 0.7, 0.8 and 0.9 were grouped into a first group 801, the analysis target articles with the risk levels of 1.2 and 1.3 were grouped into a second group 803, and analysis target articles with risk levels of 0.3, 0.4 and 0.5 were grouped into a third group 805. In such a way, according to an embodiment of the present invention, a plurality of sections according to the risk level are set and the analysis target articles belong to each section such that grouping of analysis target articles may be performed.

Figure 9:
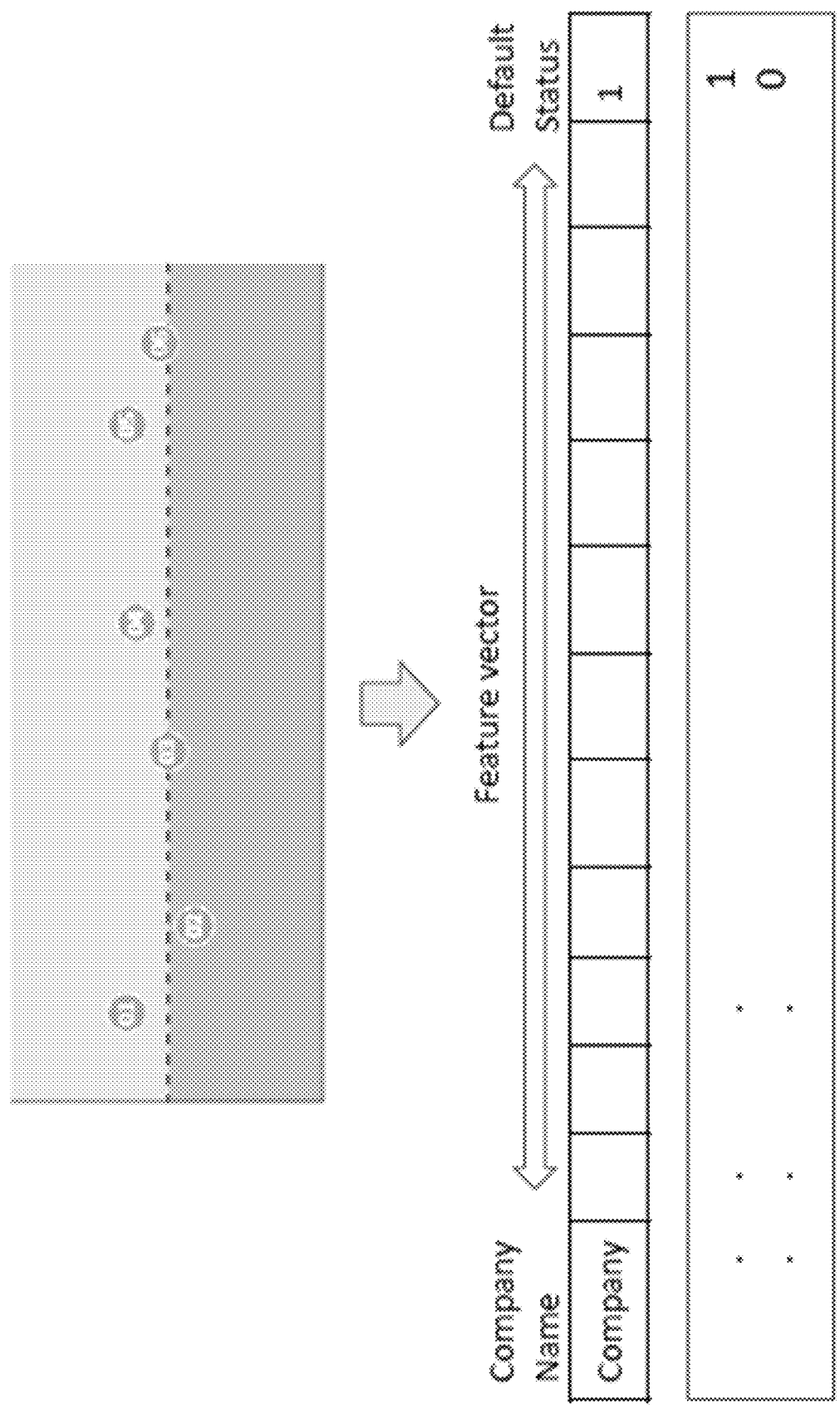
FIG. 9 is a diagram for describing a method of calculating a default risk of an analysis target business based on classified feature vectors by a default prediction device according to an embodiment of the present invention.

FIG. 9 is a diagram for describing a method of calculating a default risk of an analysis target business based on classified feature vectors by the default prediction device 100 according to an embodiment of the present invention.

Referring to FIG. 9, after grouping the analysis target articles based on the risk level, the default prediction device 100 may generate feature vectors representing each group. The feature vector may include, as elements of the vector, statistics calculated based on risk levels of analysis target articles belonging to each group. The statistics calculated based on the risk level of the analysis target articles may include a minimum value, a maximum value, a mean, a median, and a mode.

After generating feature vectors for each group, the default prediction device 100 may calculate a default risk of the analysis target business based on the generated feature vectors. According to an embodiment, the default prediction device 100 may calculate default risk and finally determine the default risk of the business in a yes or no form.

In this process, the default prediction device 100 may classify the feature vectors through a decision tree algorithm. That is, feature vectors may be classified based on various kinds of characteristics of feature vectors. Based on the classification result, the default risk prediction value of the analysis target business may be calculated. The reliability of the default risk prediction may also be calculated.

According to one embodiment, in calculating the default risk prediction value through the decision tree algorithm, the default prediction device 100 may be based on the probability distribution value of each class. For example, based on the probability that the same class will appear in the same branch of the decision tree, that is, the probability that feature vectors used to classify data will be classified into a particular class, the default risk prediction value may be calculated.

In addition to the default risk prediction, the default prediction device 100 may calculate the reliability of the default risk prediction. This may be calculated in the form of reducing the reliability when the default risk prediction value is calculated without all the characteristics of the feature vectors examined by the decision tree algorithm. For example, there are 10 criteria by which feature vectors may be classified on a decision tree algorithm, when the final class classification is completed with only some of the criteria used, the default risk prediction value is calculated. As the number of criteria used is estimated to be small, the reliability calculation may be performed in a manner that the reliability decreases.

Figure 10:
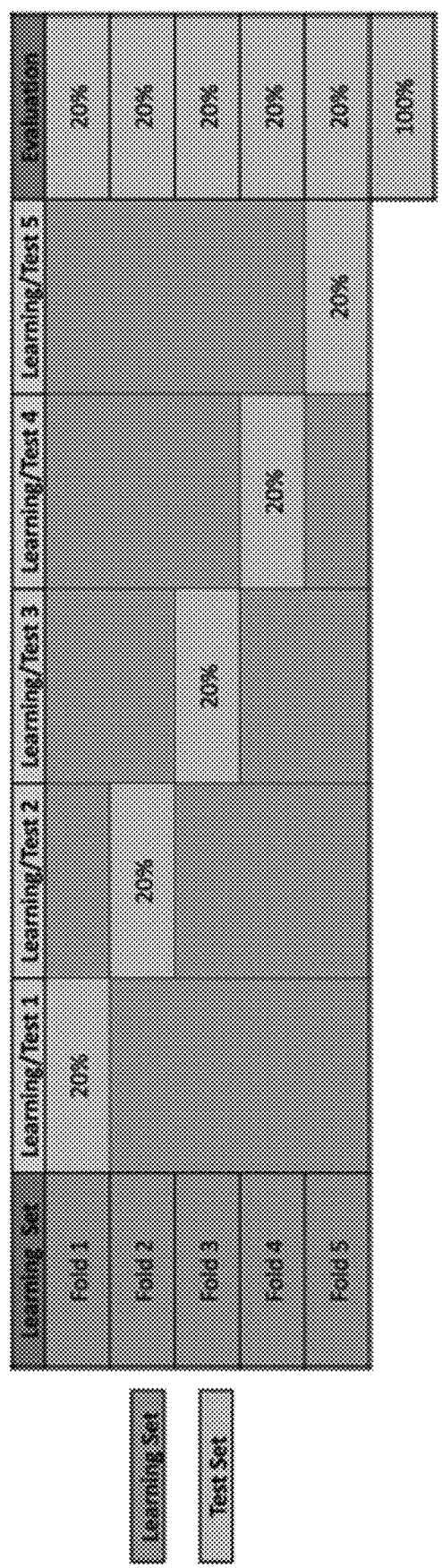
FIG. 10 illustrates a cross-validation scheme used by a default prediction device according to an embodiment of the present invention to classify feature vectors through a decision tree algorithm.

FIG. 10 illustrates an n-cross-validation scheme used by the default prediction device 100 according to an embodiment of the present invention to classify feature vectors through a decision tree algorithm.

Referring to FIG. 10, in classifying feature vectors through a decision tree algorithm, the default prediction device 100 may perform classification through an n-cross validation scheme. Specifically, the default prediction device 100 classifies the data into n based on the data including the risk level information calculated for the analysis target articles, and then uses one of the n data sets as a test data and uses the remaining set as training data (Training set or Learning set). This may be repeated n times. In such a case, according to the n-cross validation method, during the iteration, the data set used as test data is constantly changing, so that the analysis may be repeated up to n times with different test data and training data.

Figure 11:
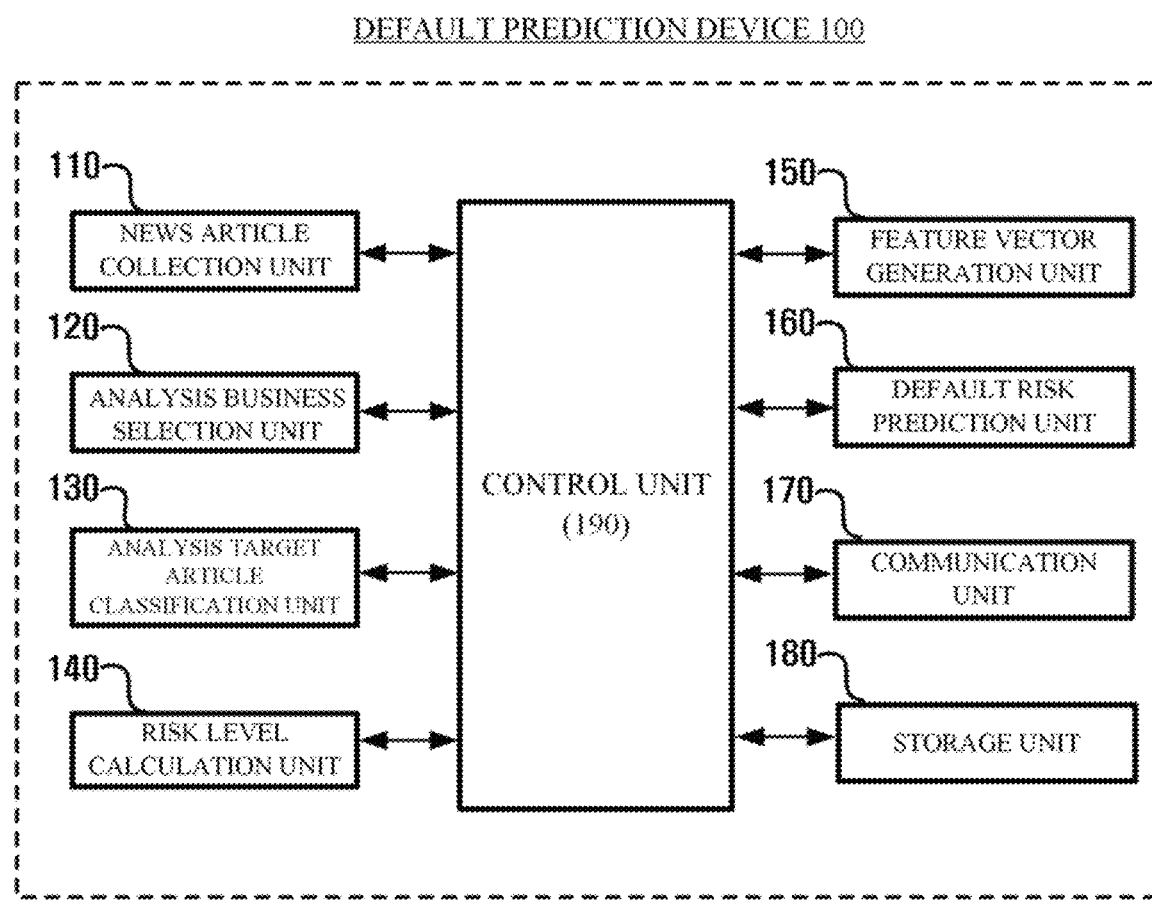
FIG. 11 is a block diagram illustrating a configuration of a default prediction device according to an embodiment of the present invention.

FIG. 11 is a block diagram illustrating a configuration of the default prediction device 100 according to an embodiment of the present invention.

Referring to FIG. 11, the default prediction device 100 includes a news article collection unit 110, an analysis business selection unit 120, an analysis target article classification unit 130, a risk level calculation unit 140, a feature vector generation unit 150, a default risk prediction unit 160, a communication unit 170, a storage unit 180, and a control unit 190.

For convenience of description, main agents that perform their respective roles in the default prediction device 100 are shown in the form of unit, but parts of each may be components that functionally classify a sub program module or a control unit 190 operating in the default prediction device 100. These program modules are concepts that encompass routines, subroutines, programs, objects, components, data structures, etc. that perform each operation or execute a particular abstract data type, but are not limited thereto.

The news article collection unit 110 may perform collection of news articles on the Internet. For this, the news article collection unit 110 may access various types of external servers 300. The news article collection unit 110 may collect news articles by crawling the news-related data published on the web.

According to an embodiment, the news article collection unit 110 may classify and collect only articles related to the corresponding business when the analysis target business is selected. In performing these functions, the news article collection unit 110 may use the functions of the analysis business selection unit 120 and the analysis target article classification unit 130 which will be described later.

The analysis business selection unit 120 may select a business that is an analysis target. As mentioned above, the news article collection unit 110 may collect only articles related to the business selected by the analysis business selection unit 120, and the analysis target article classification unit 130, which will be described later, may also classify articles about businesses selected by the analysis business selection unit 120. According to one embodiment, the analysis business selection unit 120 may select a plurality of analysis target business, and may select a business corresponding to the business information received from the user terminal 200 as the analysis target business.

The analysis target article classification unit 130 may classify news articles related to the analysis target business among the collected news articles into analysis target articles. For this, the analysis target article classification unit 130 may first select news articles including the name of the analysis target business, and determine whether each of the selected news articles is related to the analysis target business.

The analysis target article classification unit 130 may utilize a morpheme analysis library in selecting news articles including the name of the analysis target business. In addition, when news articles including the name of the analysis target business are selected, the analysis target article classification unit 130 may identify a context or a subject of each of the selected news articles, and determine whether the identified context or the subject is related to the analysis target business information. For example, the analysis target business is a toy manufacturing business. If one of the selected articles, including the name of the business, includes semiconductor content that is completely unrelated to it, the analysis target article classification unit 130 may determine that the article is not related to the analysis target business information and exclude it from the analysis target article.

The risk level calculation unit 140 may calculate a risk level for each of the analysis target articles classified by the analysis target article classification unit 130. In this process, the risk level calculation unit 140 may adopt a specific machine learning algorithm and perform regression or itemization analysis on the collected news articles using the machine learning algorithm. The risk level calculation unit 140 may calculate a risk level for each analysis target article using a risk calculation algorithm derived with a result of regression analysis or itemization analysis.

The risk level calculation unit 140 may perform analysis on all news articles collected by the news article collection unit 110 as well as news about the analysis target business. That is, since the risk level calculation unit 140 needs to learn the corresponding machine learning algorithm in using the machine learning algorithm, it may use these news articles as training data. According to an embodiment, the risk level calculation unit 140 may manage not only news articles but also default information of a business. The default information of the business may include business information on default occurrence and information related to a time point at which the default occurs.

In performing an analysis of news articles collected through machine learning algorithms, the risk level calculation unit 140 may only target news articles about businesses that have defaults and may select only news articles published within a predetermined time from the default of the corresponding business for news articles about the business in which the default occurs as an analysis target. For example, the risk level calculation unit 140 may target only news articles published for two years before the default occurrence date when a default occurs in a specific company.

In such a way, the risk level calculation unit 140 analyzes only the news articles issued within a predetermined time period before the default occurrence of the business, with respect to the business in which the default occurs, through a machine learning algorithm. As the risk level for each analysis target article is calculated using a risk calculation algorithm derived according to the analysis result, the accuracy of risk level calculations may be improved. That is, the risk level calculation unit 140 may perform the learning through the articles of the business recognized that the default occurs in the operation to perform the learning of the machine learning algorithm, and may calculate a risk level for each of the news articles of the analysis target business whose default does not occur until now using the risk calculation algorithm derived through the machine learning algorithm.

The feature vector generation unit 150 may group the analysis target articles based on a risk level calculated for each of the analysis target articles and generate feature vectors representing each group.

The feature vector generation unit 150 may classify the analysis target articles into a plurality of groups according to the section of the risk level calculated for the analysis target articles, and may generate feature vectors representing a group based on statistics of risk levels of the analysis target articles included in each group.

According to an embodiment, the risk level statistics of the analysis target articles used by the feature vector generation unit 150 in generating the feature vectors may include mean, median, mode, a minimum value, a maximum value, and the like of risk level numerical values. The feature vector generation unit 150 may generate a feature vector using these statistics or other numerical values calculated using the same as elements of the feature vector.

According to one embodiment, in classifying risk levels into a plurality of sections, the feature vector generation unit 150 may perform classification in a different manner according to the type of industry to which the analysis target business belongs. For example, the feature vector generation unit 150 may classify industries into manufacturing, medical, financial, and telecommunications industries, identify where the analysis target business belongs, and then perform risk level section classification customized to each industry type. As another example, the feature vector generation unit 150 may classify an industry to which the analysis target business belongs to a manufacturing or non-manufacturing industry, and perform a risk level section classification accordingly.

The default risk prediction unit 160 may calculate a default risk prediction value of the corresponding business based on the plurality of feature vectors generated for the analysis target business and calculate a reliability related to the prediction value calculation.

According to an embodiment, the default risk prediction unit 160 may calculate a default risk prediction value by classifying feature vectors through a decision tree algorithm. The default risk prediction unit 160 may classify data including feature vectors generated for the group of analysis target articles into n and then, classify feature vectors by applying a decision tree into n data sets through n-cross validation.

The default risk prediction unit 160 may calculate a default risk prediction value based on the probability distribution value of each class on the decision tree. Also, in calculating the reliability of the default risk prediction, the default risk prediction unit 160 may calculate the reliability of the default risk prediction based on the number of features examined by the decision tree algorithm in the process of calculating the default risk prediction value.

The communication unit 170 allows the default prediction device 100 to communicate with the user terminal 200 and the external server 300. The communication network used by the communication unit 170 to perform communication may be configured regardless of communication modes such as wired and wireless, and may be implemented in various types of communication networks.

The storage unit 180 may store data used in the operation of the default prediction device 100. For example, the storage unit 180 may store and manage the collected news article data and analysis data thereof.

The storage unit 180 may include, for example, a memory, a cache, a buffer, or the like, and may be configured of software, firmware, hardware, or a combination of two or more thereof. According to an embodiment, the storage unit 180 may be implemented in the form of a read only memory (ROM).

The control unit 190 may perform a function of controlling data flows between the news article collection unit 110, the analysis business selection unit 120, the analysis target article classification unit 130, the risk level calculation unit 140, the feature vector generation unit 150, the default risk prediction unit 160, the communication unit 170, and the storage unit 180. That is, the control unit 190 according to the present invention may control to perform each unique function in the news article collection unit 110, the analysis business selection unit 120, the analysis target article classification unit 130, the risk level calculation unit 140, the feature vector generation unit 150, the default risk prediction unit 160, the communication unit 170, and the storage unit 180.

In FIG. 11, the news article collection unit 110, the analysis business selection unit 120, the analysis target article classification unit 130, the risk level calculation unit 140, the feature vector generation unit 150, and the default risk prediction unit 160 are configurations to functionally classify the control unit 190 so that they may be integrated into one control unit 190 and configured.

Figure 12:
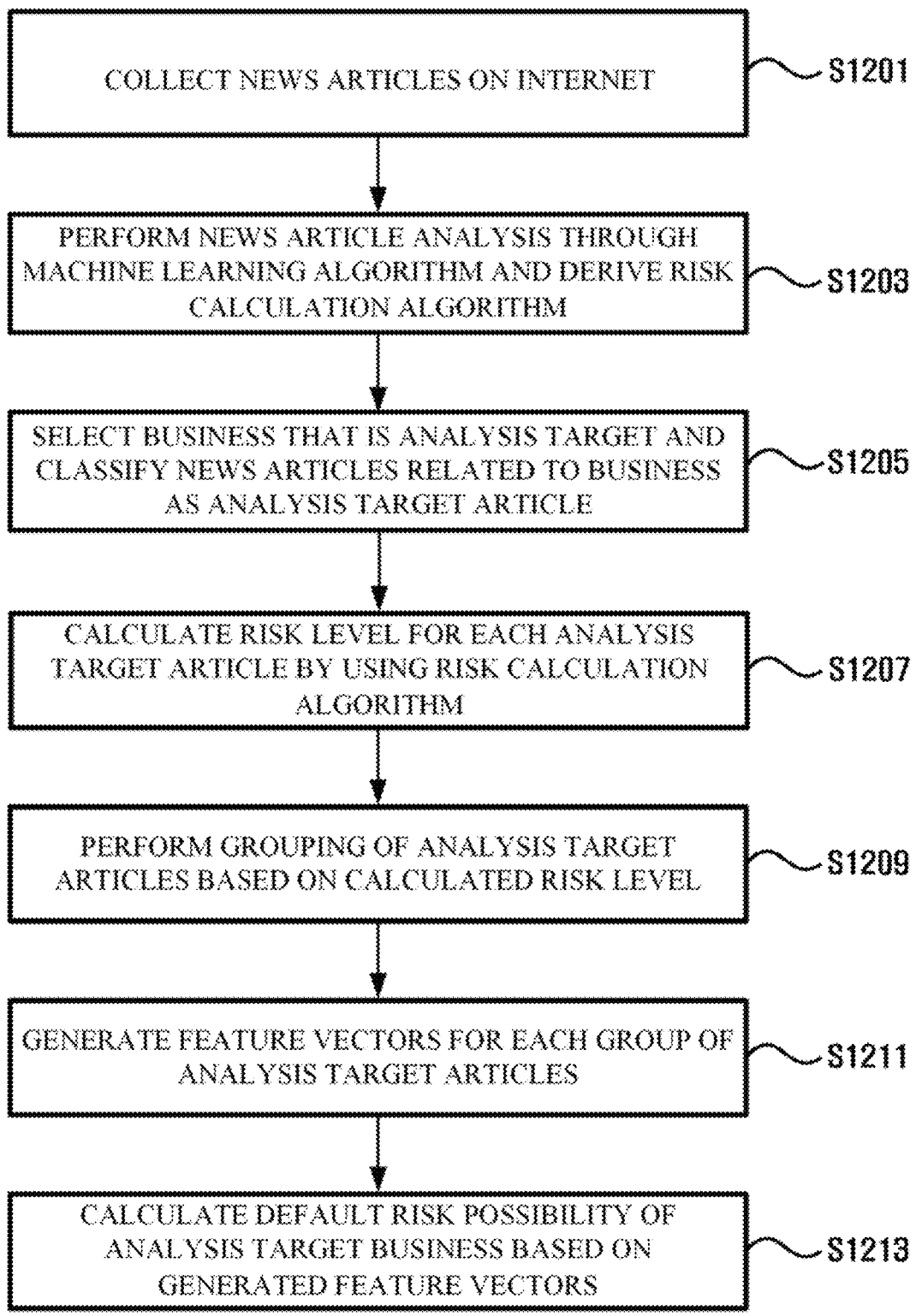
FIG. 12 is a flowchart illustrating a process of deriving a default risk prediction value of an analysis target business by a default prediction device according to an embodiment of the present invention.

FIG. 12 is a flowchart illustrating a process of deriving a default risk prediction value of an analysis target business by the default prediction device 100 according to an embodiment of the present invention.

Referring to FIG. 12, the default prediction device 100 may perform collection of news articles on the Internet (S1201). The news article data accumulated in such a collection operation may be used as training data or test data of a machine learning algorithm later, and only news articles related to the business selected as the analysis target business may be classified separately and used to predict the default risk.

The default prediction device 100 may perform news article analysis and derive a risk calculation algorithm through a machine learning algorithm (S1203). In this process, the default prediction device 100 may adopt a specific machine learning algorithm by performing news article analysis through various kinds of machine learning algorithms and comparing the results. In addition to the news article data, the default prediction device 100 may collect and manage default information of business and evaluate the news article analysis result based on the default information.

The default prediction device 100 may select a business that is an analysis target and classify news articles related to the business as an analysis target article (S1205). The selection of the analysis target business is performed by a user, so that selection information may be transmitted from the user terminal 200 to the default prediction device 100, or may be performed by an administrator of the default prediction device 100. The default prediction device 100 may classify news articles related to the corresponding business from previously collected news articles, but may newly search and collect news articles related to the corresponding business on the Internet. The default prediction device 100 may collect only the article including the name of the analysis target business using the morpheme library.

In selecting a business that is an analysis target and classifying news articles related to the business as an analysis target article, the default prediction device 100 may select only news articles including the name of the analysis target business among all news articles collected using the morpheme library and classify only news articles related to the analysis target business among the articles selected using the NER algorithm as analysis target articles. Unlike this, when only news articles including the name of the analysis target business are collected in the collection operation, the default prediction device 100 may classify only news articles related to the analysis target business into analysis target articles using the NER algorithm.

After classifying the analysis target article, the default prediction device 100 may calculate a risk level for each analysis target article by using a risk calculation algorithm derived in operation S1203 (S1207).

When the risk level for each of the analysis target articles is calculated, the default prediction device 100 may perform grouping of the analysis target articles based on the calculated risk level (S1209). According to an embodiment, the grouping of the analysis target articles may be performed based on to which of the plurality of sections the risk level calculated for each article belongs.

The default prediction device 100 may generate feature vectors for each group of analysis target articles by using the result of grouping the analysis target articles (S1211). The elements included in the feature vectors may be various statistics calculated based on the risk levels of the analysis target articles included in each group or numerical values calculated using the statistics.

The default prediction device 100 may finally calculate a default risk of the analysis target business based on the generated feature vectors (S1213). The default risk calculation of the analysis target business may be performed by classifying feature vectors through decision tree algorithms. In addition, the default prediction device 100 may separately calculate the reliability of the default risk prediction in the process of calculating the default risk prediction value.

In such a way, according to various embodiments of the present invention, a default risk of a corresponding business may be calculated by analyzing news articles about a specific business. Based on this, banks may perform credit ratings on their businesses and may further strengthen their loan risk management on their businesses. In addition, among the various machine learning algorithms, a suitable algorithm for default risk calculation may be selected, and not only the risk level of each news article is calculated independently, but the overall default risk may be predicted by grouping the news articles.

According to embodiments of the present invention, for a specific business, news articles that are directly related to the business may be selected and the default risk prediction of the business may be performed based on only those articles.

According to embodiments of the present invention, an effective machine learning algorithm may be used to predict the default risk. The risk level for each article is calculated independently and also, analysis of the grouping of news articles may improve the accuracy of the default risk prediction.

The effects of the present invention are not limited to the effects mentioned above, and other advantages not mentioned in this specification will be apparent to those skilled in the art from the following description.

Operations of a method or algorithm described in relation to an embodiment of the present invention may be implemented directly in hardware, in a software module executed by hardware, or in a combination thereof. The software module may reside on Random Access Memory (RAM), Read Only Memory (ROM), Erasable Programmable ROM (EPROM), Electrically Erasable Programmable ROM (EEPROM), Flash Memory, Hard Disk, Removable Disk, CD-ROM, or any form of computer readable recording medium well known in the art.

In the above, embodiments of the present invention have been described with reference to the accompanying drawings, but those skilled in the art will understand that the present invention may be embodied in other specific forms without changing the technical spirit or essential features thereof. Therefore, the embodiments described above are illustrative and are not restricted in all aspects.

What is claimed is:

1. A processor-implemented method of predicting a risk of a target, which is performed by a computing system comprising a non-transitory storage medium readable by a processing circuit and storing instructions for execution by the processing circuit for performing the method, comprising:

collecting, by the processing circuit, digital data including a plurality of news articles retrieved from the Internet;

selecting, by the processing circuit, an analysis target based on a request from a user;

classifying, by the processing circuit, the digital data related to the analysis target among the collected digital data into analysis target articles;

creating, by the processing circuit, a first training data set and a second verifying test data set respectively transformed from the collected digital data;

training, by the processing circuit, a machine learning algorithm model using the created first training data set, by evaluating an outcome of the machine learning algorithm model using the created second verifying test data set;

determining, using the trained machine learning algorithm model and by the processing circuit, a risk level for each of the analysis target articles;

generating, by the processing circuit, feature vectors representing each group by performing grouping of the analysis target articles based on the risk level determined using the trained machine learning algorithm model; and predicting, by the processing circuit, a predefined risk of the analysis target based on the generated feature vectors, wherein the determining of the risk level for each of the analysis target articles comprises, after adopting the trained machine learning algorithm model and performing regression or itemization analysis on the collected new articles using the trained machine learning algorithm model, determining the risk level for each of the analysis target articles using a risk calculation algorithm derived through the regression or itemization analysis, wherein the generating of feature vectors representing each group by performing grouping of the analysis target articles based on the determined risk level comprises classifying a risk level into a plurality of sections based on the risk level determined using the trained machine learning algorithm model for the analysis target articles, and through this, performing grouping of the analysis target articles, wherein the determining of the predefined risk of the analysis target based on the generated feature vectors further comprises, after classifying feature vectors of the analysis target articles on which grouping is performed through a decision tree algorithm, determining a risk prediction value of the analysis target based on the classification result, and wherein the classifying of the feature vectors of the analysis target articles on which the grouping is performed through the decision tree algorithm further comprises, after classifying data including feature vectors generated for a group of the analysis target articles into n, classifying feature vectors by applying a decision tree algorithm to n data sets through an n-cross validation method, the n-cross validation method including an iteration during which the data sets used as test data are constantly changing so that the applying is repeated up to n times with different test data and training data.

2. The method of claim 1, further comprising, in performing the regression or itemization analysis on the collected news articles using the machine learning algorithm model being trained, selecting, by the processing circuit, as an analysis target, only news articles published within a predetermined time from the predefined risk of the corresponding target among news articles related to a business where the predefined risk occurs.

3. The method of claim 1, wherein the classifying of the news articles related to the analysis target among the plurality of collected news articles into the analysis target articles further comprises:

selecting news articles including the name of the analysis target; and determining whether an article is related to the analysis target with respect to each of the selected news articles.

4. The method of claim 3, wherein the determining whether the article is related to the analysis target with respect to each of the selected news articles further comprises identifying a context or topic for each of the selected news articles and determining whether the identified context or topic is related to information of the analysis target.

5. The method of claim 1, wherein the classifying of the risk level into the plurality of sections performs classification in different methods according to a type of sector to which the analysis target belongs.

6. A computing system that predicts a risk of a target, the computing system comprising a processor in communication with one or more types of memory, the processor configured to:
- by a news article collection unit, collect digital data including a plurality of news articles retrieved from the Internet;
- by an analysis target selection unit, select an analysis target;
- by an analysis target article classification unit, classify digital data related to the analysis target among the collected digital data into analysis target articles;
- creating, by the processing circuit, a first training data set and a second verifying test data set respectively transformed from the collected digital data;
- train a machine learning algorithm model, using the created first training data set, by evaluating an outcome of the machine learning algorithm model using the created second verifying test data set;
- by a risk level determination unit, determine, using the trained machine learning algorithm model, a risk level for each of the analysis target articles;
- by a feature vector generation unit, generate a feature vector representing each group by performing grouping of the analysis target articles based on the determined risk level; and
- by a risk prediction unit, predict a predefined risk of the analysis target based on the generated feature vector, wherein the risk level determination unit, after adopting the trained machine learning algorithm model and performing regression or itemization analysis on the collected new articles using the trained machine learning algorithm model, is configured to determine the risk level for each of the analysis target articles using a risk calculation algorithm derived through the regression or itemization analysis, wherein the feature vector generation unit is configured to classify a risk level into a plurality of sections based on the risk level determined for the analysis target articles, and through this, performing grouping of the analysis target articles, wherein the determining of the predefined risk of the analysis target based on the generated feature vectors further comprises, after classifying feature vectors of the analysis target articles on which grouping is performed through a decision tree algorithm, determining a risk prediction value of the analysis target based on the classification result, and wherein the classifying of the feature vectors of the analysis target articles on which the grouping is performed through the decision tree algorithm further comprises, after classifying data including feature vectors generated for a group of the analysis target articles into n, classifying feature vectors by applying a decision tree algorithm to n data sets through an n-cross validation method, the n-cross validation method including an iteration during which the data sets used as test data are constantly changing so that the applying is repeated up to n times with different test data and training data.

* * * * *